United States Patent Office 3,475,484
Patented Oct. 28, 1969

3,475,484
PROCESS FOR THE PREPARATION OF ESTERS FROM MYRCENE HYDROHALIDES
Garry C. Kitchens, Wayne, and Robert T. Dahill, Jr., Perth Amboy, N.J., assignors to Givaudan Corporation, Clifton, N.J., a corporation of New Jersey
No Drawing. Filed Nov. 17, 1967, Ser. No. 683,785
Int. Cl. C07c 69/02; B01j 11/82; C01g 1/06
U.S. Cl. 260—489
9 Claims

ABSTRACT OF THE DISCLOSURE

The use of a novel catalyst, a phosphorous trichloride-ammonia addition product, in the double decomposition reaction of myrcene hydrohalides, singly or in combination, and carboxylic acid salts, is disclosed. The catalyst, $PCl_3(NH_3)_5$, may be formed in situ.

The resulting esters are obtained in good yield and have a high ratio of the more desirable linalyl esters as compared with the neryl esters and geranyl esters.

BACKGROUND OF THE INVENTION

The reactions of myrcene hydrochloride with alkali salts of fatty acids with solvents, as acetic acid and acetic anhydride, and without solvents, to give 40-80% weight yields (based on mycrene) of esters have been reported in literature:

Fornet, Seifensider Zeitung, 63, 707–9, 739–41 (1936)
Knapp et al., U.S. 2,609,388 (1950)
Bell et al., U.S. 2,871,271 (1952)
Bay, U.S. 2,062,874 (1962)
Boake Roberts Co., Brit. 896,262 (1962)

These methods all have disadvantages. The reactions of the chlorides with sodium acetate without solvents give poor weight yields of the esters, of the order of 40 to 50% based on myrcene. The use of large quantities of the expensive solvents, acetic acid and acetic anhydride, increases the weight yields to 50-60%, based on the myrcene. The use of ammonium acetate increases the weight yield to 70-80%, based on the myrcene used.

The use of triethylamine acetate to convert simple alkyl chlorides to acetates has beeen revealed. (Mills et al., Chem. & Ind., 52, 2144 (1962). This method is not economically feasible, since large quantities of the expensive triethylamine is required and the amine would have to be recovered. In applying the process to the production of linalyl, neryl and geranyl esters, it was found that 20-40% of the amine added in the form of its acetate is lost and cannot be recovered.

The preparation of linalyl, neryl and geranyl esters, containing a large amount of the α form of these esters, is described by Bain, U.S. 3,062,875 (1962). Myrcene is treated with 2 moles of hydrogen chloride to form myrcene dihydrochloride which is converted to esters by treatment with metal salts of carboxylic acids in the presence of 1% or more of an amine. This method has the disadvantage that 2 moles of hydrogen chloride is required to form the myrcene dihydrochloride and the dihydrochloride requires two moles of the metal salt to be converted to the esters. The method has the further disadvantage in that the products are 70-75% of the α-forms of the esters, while the linalyl, neryl and geranyl esters known and used in perfumery are mainly the β-forms. This process also has the disadvantage in that dehydrohalogenation must occur in order to obtain the mono acyloxy ester.

A method for the preparation of predominantly linalyl ester is disclosed by Webb, U.S. 3,076,839 (1963). Myrcene hydrochlorides are treated with a carboxylic acid salt in the presence of a cuprous halide and a carboxylic acid solvent. The disadvantages of this method are the use of 4 to 5% of expensive cuprous halides and the large quantities of expensive carboxylic acid solvent. The recovery of the acid solvent and the isolation of the products also add to the cost.

A method for the preparation of predominantly neryl and geranyl ester is disclosed by Webb, U.S. 3,031,442, where myrcene hydrochloride is treated with a carboxylic acid salt under nonaqueous conditions in the presence of a nitrogen base catalyst. The main disadvantage of this method is that it gives only small amounts of the more expensive linalyl esters.

The teachings of Webb, U.S. 3,076,839 (1963) and U.S. 3,031,442 (1962), are that in the conversion of myrcene hydrochloride to esters cuprous chloride is a catalyst for linalyl ester production and the nitrogen base is a catalyst for the neryl and geranyl ester production. "Thus while in acetic acid solution, cuprous chloride causes dominately (sic) linalyl ester production, even if a little nitrogen base is present and while in a definitely basic system, such as is present when myrcene hydrochloride is treated with sodium acetate and an amine, the nitrogen base causes preponderately geranyl ester formation even if a little cuprous chloride is present, there are reaction conditions whereby both types of catalysts takes place so that the ester produced is rich in both linalyl and geranyl esters." The inventor attempts to explain these intermediate reaction conditions as between definite basicity and definite acidity conditions.

Yamashita and Shimamura, Kogyo Kagahu, Zasshi, 60, 423–6 (1957), C.A., 53, 9025 (1959) describe the catalytic effect of tertiary amines on sodium chloride eliminating esterification. The promoting effects of pyridine in various amounts on the esterification reactions between benzyl chloride and sodium acetate or sodium benzoate were examined with or without xylene, xylene-water, xylene-acetic acid, xylene-benzyl alcohol, xylene-ethyl alcohol or water at different temperatures. Similar experiments were also carried out for the reactions of $C_6H_4Cl_2$, $CH_3C_6H_4Cl$, $ClC_6H_4NO_2$, $ClC_6H_2(NO_2)_3$ or cetyl chloride and sodium acetate in the presence of pyridine. The catalytic effects on benzyl chloride and sodium acetate reaction and other amines, dibutyl sulfide, triethylarsine and triethyl phosphine were studied.

A method of treating myrcene hydrogenhalides (linalyl, neryl and geranyl halides) with a carboxylic acid salt in the presence of dimethyl sulfoxide ("solvent catalyst") to yield linalyl, neryl and geranyl esters is described by Webb, U.S. 3,280,177 (1966). This method has the disadvantage that it would be necessary to recover the dimethyl sulfoxide solvent which would add to the cost of the esters.

Webb, U.S. 3,293,286 (1966) describes a method of preparing predominantly neryl and geranyl esters by treating linalyl, neryl and geranyl halides with a carboxylic acid salt and a phosphorus containing catalyst selected from the group consisting of phosphorus, phosphonium salts and trivalent phosphorus compounds having the formula

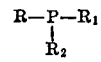

where R, $R_1$ and $R_2$ are selected from the group consisting of hydrogen, alkyl, cyclo-alkyl, aryl, alkylamino, arylamino, cyclo-alkylamino and amino. This process has the disadvantage that the catalyst is expensive and hazardous, requiring special safety precautions, also it produces predominantly neryl and geranyl esters and only small quantities of the more expensive linalyl esters.

SUMMARY OF THE INVENTION

This invention relates to the novel use of the phosphorus trichloride-ammonia addition compound, as a promoter in the reaction of myrcene hydrohalides and alkali salts of fatty acids, to produce the valuable perfume materials, linalyl, neryl, and geranyl esters. The use of this novel compound provides a novel method for obtaining a product high in linalyl ester content.

DESCRIPTION OF THE PREFERRED EMBODIMENTS

In one aspect of the present invention, it involves a process for preparing esters by reacting at least one member of the group consisting of myrcene hydrohalide, linalyl halide, neryl halide and geranyl halide, with a carboxylic acid salt, in the presence of an addition compound of phosphorus trichloride and ammonia as a catalyst.

In another aspect, the present invention provides a novel compound, $PCl_3 \cdot (NH_3)_5$.

The novel catalyst, phosphorus trichloride-ammonia adidtion compound, formula $PCl_3 \cdot 5NH_3$, prepared by the addition of 5 moles of ammonia to 1 mole of phosphorus trichloride, is inexpensive, easy to prepare, stable solid which can be stored and handled without special precautions. The catalyst can also be prepared in situ in the process.

The invention applies to myrcene hydrohalides, e.g., hydrogen chloride, hydrogen bromide and hydrogen iodide. The invention is illustrated by means of the hydrogen chloride derivative of myrcene, since this is the more important hydrohalide from a commercial point of view.

The preparation of myrcene hydrochloride is well known (Guenther, "The Essential Oils," vol. II, D. Van Nostrand Co., New York, 1949, pp. 778–79; Fornet, Seifensider Zeitung, 63, 707–9 (1936), 63, 739–41 (1936); Knapp et al., U.S. 2,609,388 (1950); Booth, U.S. 2,871,271 (1953); Boake Roberts Co., Brit. 896,262 (1962); Weiss, U.S. 2,882,323; Webb, U.S. 3,016,408). Myrcene hydrochloride is prepared by the treatment of myrcene with one equivalent of anhydrous hydrogen chloride in the presence of a cuprous or a cupric salt. The chloride, known as myrcene hydrochloride, consists of a mixture of linalyl, neryl and geranyl chlorides with lesser amounts of myrcenyl chloride, dipentene hydrochloride, bornyl chloride and myrcene dihydrochloride.

In accordance with the process of this invention, myrcene hydrochloride is reacted with 1 to 1.5 moles of an alkali salt of a fatty acid and 0.001 to 0.1 mole of the phosphorus trichloride-ammonia addition compound until at least 80% of the chlorides have reacted. A reaction temperature of 70 to 100° C. is preferred. Lower temperatures require longer reaction periods, while higher temperatures give lower yields of the desired esters; the esters being destroyed and more residue formed.

The mechanism of the reaction and the role of the promoter in the conversion of myrcene hydrohalides to esters using alkali metal salts of carboxylic acids, is not known. To postulate a mechanism for the reaction or the role of the promoter is difficult due to the fact that the chemistry of some of the phosphorus compounds is confusing or not known. For example, see the reactions of phosphorus trichloride with ammonia in J. W. Mellor, "Inorganic and Theoretical Chemistry," vol. VIII, Longmane, Green and Co., New York, 1947, pp. 220, 271, 708, 1004, 1014; H. Peperot, compt. rend., 181x, 662 (1925).

The reactions involved can be illustrated, using linalyl, neryl and geranyl chlorides, sodium acetate and the catalyst to yield esters, as follows:

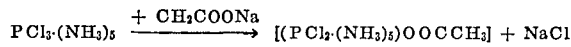

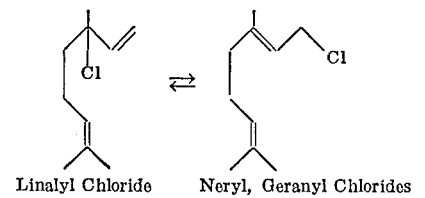

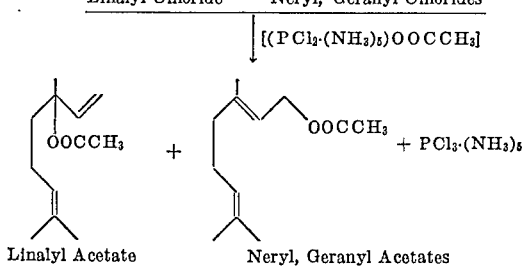

Thus, in excess sodium acetate the products of the reaction are esters, sodium chloride, unreacted sodium acetate and the phosphorus containing catalyst.

In order to clarify further the nature of the present invention the following examples are given, by way of illustration and not by way of limitation. Unless otherwise specified, all temperatures are in degrees centigrade, all boiling points are uncorrected, and all amounts are in parts by weight.

EXAMPLE I

Into a one liter flask equipped with an agitator, thermometer, gas inlet tube and sealed to the air by a bubbling tube containing 1 inch of heavy mineral oil, was charged 250 g. myrcene, distilled (80%) and 2.5 g. of cupric acetate. The flask was evacuated and 56 g. anhydrous hydrogen chloride was passed in over the surface at 10° C. over a 4 hour period with cooling and vigorous agitation. The batch was agitated an additional ½ hour at 10° C. The crude chlorides amounted to 308.5 g.

To the myrcene hydrochloride was added 159.1 g. of anhydrous sodium acetate and the batch heated to 90° C. The batch was agitated at 90–95° C. for 8 hours.

Samples were taken at intervals during the agitation period, washed, dried and analyzed by vapor pressure chromatography (V.P.C.).

| Sample | Total Agitation Time (Hrs.) | Percent Hydrocarbon and Chlorides | Percent Linalyl Acetate | Percent Terpinyl Acetate and Isomers | Percent Neryl Geranyl Acetates | Total percent Linalyl, Neryl, Geranyl Acetates |
|---|---|---|---|---|---|---|
| 1 | 1 | 90.9 | 2.8 | 1.2 | 5.1 | 7.9 |
| 2 | 2 | 96.8 | 0 | 0 | 3.2 | 3.2 |
| 3 | 4 | 96.2 | 0 | 0 | 3.8 | 3.8 |
| 4 | 6 | 97.1 | 0 | 0 | 2.9 | 2.9 |
| 5 | 8 | 96.9 | 0 | 0 | 3.1 | 3.1 |

EXAMPLE II

Into a one liter flask equipped with an agitator, thermometer, gas inlet tube and sealed to the air by a bubbling tube containing 1 inch of heavy mineral oil, was charged 250 g. myrcene, distilled (80%) and 2.5 g. of cupric acetate. The flask was evacuated and 56 g. anhydrous hydrogen chloride was passed in over the surface at 10° C. over a 5 hour period with cooling and vigorous agitation. The batch was agitated an additional ½ hour at 10° C. The crude chlorides amounted to 308.5 g.

(A) To the myrcene hydrochloride was added 155 g. of anhydrous sodium acetate and 3.5 g. phosphorus trichloride. The batch was heated to 70° C. and agitated at 70-75° C. for 20 hours.

The salts were dissolved in 600 ml. of water. The aqueous layer was extracted with 100 ml. of hexane and the hexane layer added to the oil layer. The oil-hexane layer was washed 2× 100 ml. of water, 1× 50 ml. of 10% NaHCO$_3$. The hexane was removed by distillation under slightly reduced pressure. The residual crude acetates amounted to 300 g. (7.71% Cl). The crude analyzed by V.P.C. as follows:

| | Percent |
|---|---|
| Hydrocarbons and chlorides | 60.4 |
| Linalyl acetate | 33.9 |
| Neryl, geranyl acetates | 5.7 |

The crude acetates were saponified as follows: Into a one liter flask, equipped with an agitator, thermometer and a condenser was charged 350 g. methanol, 140 g. of 50% aqueous sodium hydroxide solution. The batch was agitated and heated to reflux and the crude acetates were added over a 10 minute period. The batch was agitated and refluxed for 8 hours. The methanol was distilled off at atmospheric pressure to a pot temperature of 95° C. The recovered methanol was diluted with twice its weight of water and the oil added to the batch. The crude was separated and washed 2× 100 ml. of water and 2× 50 ml. of saturated salt water. The crude alcohols amounted to 255 g. The crude alcohols analyzed by V.C.P. as follows:

| | Percent |
|---|---|
| Hydrocarbons | 59.2 |
| Linalool | 18.3 |
| Terpene ethers | 17.6 |
| Terpineol and isomers | 1.1 |
| Nerol, geraniol | 3.7 |

(B) Myrcene hydrochlorides (308.5 g.), prepared as described above, 155 g. anhydrous sodium acetate, 0.5 g. cupruos chloride and 3.5 g. phosphorus trichloride were agitated and heated at 90-95° C. for 17 hours. The reaction was worked up for esters as described above and gave 307 g. crude esters containing 4.3% chlorine and which analyzed by V.P.C. as follows:

| | Percent |
|---|---|
| Hydrocarbons and chlorides | 36.5 |
| Linalyl acetate | 52.8 |
| Terpinyl acetates | 1.2 |
| Neryl, geranyl acetate | 9.5 |

Saponification of the crude esters as described above gave 255 g. crude alcohols which analyzed by V.C.P. as follows:

| | Percent |
|---|---|
| Hydrocarbons and terpene ethers | 55.2 |
| Linalool | 33.2 |
| Terpineol and isomers | 2.5 |
| Nerol, geraniol | 9.1 |

Purification of the crude alcohols prepared using PCl$_3$ as catalyst established that the highest weight yields that could be obtained were about 30% linalool and 10% nerol, geraniol, based on 100% myrcene.

EXAMPLE III

Into a small flask equipped with an agitator, thermometer, a gas inlet tube for above surface feed which is connected to an ammonia cylinder and sealed to the air by a bubbling tube filled with 1″ of heavy mineral oil is charged 10 g. phosphorus trichloride and 100 ml. of benzene. The batch is cooled at 25° C. and 8.0 g. of ammonia is added over a period of 1 hour at 25-30° C. and the batch is agitated an additionl 1 hour at 25 to 30° C. The solid is filtered, washed with 50 ml. benzene and dried under vacuum at room tempreature. The solid amounts to approximately 16 g. The solid analyzed 13.0% phosphorus, 48.2% chlorine, 27.9% nitrogen, 6.7% hydrogen, which corresponds to the phosphorus trichloride-ammonia addition compound, PCl$_3$·5NH$_3$ (calc.: 13.9% phosphorus, 47.8% chlorine, 31.5% nitrogen, 6.8% hydrogen).

The phosphorus trichloride-ammonia addition compound was also prepared in good yield following the above procedure and using diethyl ether or diisopropyl ether as the solvent in place of benzene.

EXAMPLE IV

Into a 1 liter flask equipped with an agitator, thermometer, gas inlet tube and sealed to the air by a bubbling tube containing 1 inch of heavy mineral oil, was charged 250 g. of myrcene, distilled (80%) and 2.5 g. of cupric acetate. The flask was evacuated and 56 g. of anhydrous hydrogen chloride was passed in over the surface at 10° C. over a 4½ hour period. The batch was agitated an additional ½ hour at 10° C. The crude chlorides amounted to 308.5 g.

To the myrcene hydrochloride were added 159.1 g. anhydrous sodium acetate and 10 g. of the phosphorus trichloride-ammonia addition compound prepared in Example III. The batch was heated to 90° C. and agitated at 90-95° C. for 6 hours. Samples were taken at intervals during the agitation period, washed, dried and analyzed by V.P.C.

| Sample | Total Agitation Time (Hrs.) | Percent Hydro-Carbon and Chlorides | Percent Linalyl Acetate | Percent Terpinyl Acetate and Isomers | Percent Neryl, Geranyl Acetates | Total percent Linalyl, Neryl, Geranyl Acetates |
|---|---|---|---|---|---|---|
| 1 | 1 | 22.6 | 59.2 | 2.7 | 15.5 | 74.7 |
| 2 | 2 | 21.8 | 60.4 | 2.1 | 15.7 | 76.1 |
| 3 | 4 | 21.4 | 59.7 | 3.6 | 15.3 | 75.0 |
| 4 | 6 | 21.9 | 60.2 | 2.1 | 15.8 | 76.0 |

The salts were dissolved in 600 ml. of water. The aqueous layer was extracted with 100 ml. of hexane and the hexane layer added to the oil layer. The oil-hexane layer was washed 2× 100 ml. of water, 1× 50 ml. of 10% NaHCO$_3$. The hexane was removed by distillation under slightly reduced pressure. The residual crude acetates amounted to 311 g. (2.4% Cl). The crude analyzed by V.P.C. as follows:

| | Percent |
|---|---|
| Hydrocarbons and chlorides | 22.6 |
| Linalyl acetate | 60.2 |
| Terpinyl acetates and isomers | 2.0 |
| Neryl, geranyl acetates | 15.2 |

The crude acetates were saponified as follows: Into a one liter flask, equipped with an agitator, thermometer, and a condenser was charged 350 g. methanol, 140 g. of 50% aqueous sodium hydroxide solution. The batch was agitated and heated to reflux and the crude acetates were added over a 10 minute period. The batch was agitated and refluxed for 8 hours. The methanol was distilled off at atmospheric pressure to a pot temperature of 95° C. The recovered methanol was diluted with twice its weight of water and the oil added to the batch. The crude was separated and washed 2× 100 ml. of water and 2× 50 ml. of saturated salt water. The crude alcohols amounted to 255 g. (0.44% Cl). The crude alcohols analyzed by V.P.C. as follows:

| | Percent |
|---|---|
| Hydrocarbon | 22.4 |
| Linalool | 59.7 |
| Terpineols and isomers | 2.8 |
| Nerol, geraniol | 15.1 |

The crude alcohols were vacuum distilled at 5 mm. using a 37 cm. column packed with glass helices. The fractions were analyzed by V.P.C. and the yield of alcohols calculated on the basis of 100% myrcene charged.

The weight yields were 64.7% linalool and 15.2% nerol, geraniol.

The total weight yield was 79.9% linalool, nerol, geraniol based on 100% myrcene charged.

EXAMPLE V

Into a 1 liter flask equipped with an agitator, thermometer, gas inlet tube and sealed to the air by a bubbling tube containing 1 inch of heavy mineral oil, was charged 250 g. of myrcene, distilled (80%) and 2.5 g. of cupric acetate. The flask was evacuated and 56 g. of anhydrous hydrogen chloride was passed in over the surface of 10° C. over a 4½ hour period. The batch was agitated an additional ½ hour at 10° C. The crude chlorides amounted to 308.5 g.

To the myrcene hydrochloride were added 152.5 g. anhydrous sodium acetate and 5.0 g. of the phosphorus trichloride-ammonia addition compound prepared in Example III. The batch was heated to 90° C. and agitated at 90–95° C. for 6¼ hours. Samples were taken at intervals during the agitation period, washed, dried and analyzed by V.P.C.

rated and washed 2× 100 ml. of water and 2× 50 ml. saturated salt water. The crude alcohols amounted to 259 g. (0.6% Cl). The crude alcohols analyzed by V.P.C. as follows:

| | Percent |
|---|---|
| Hydrocarbons and chlorides | 33.5 |
| Linalool | 48.4 |
| Terpineols and isomers | 3.3 |
| Nerol, geraniol | 14.8 |

The crude alcohols were vacuum distilled at 5 mm. using a 37 cm. column packed with glass helices. The fractions were analyzed by V.P.C. and the yield of alcohols calculated on the basis of 100% myrcene charged.

The weight yields were 54.2% linalool and 14.0% nerol, geraniol.

The total weight yield was 68.2% linalool, nerol, geraniol based on 100% myrcene charged.

EXAMPLE VI

Into a 1 liter flask equipped with an agitator, thermometer, gas inlet tube and sealed to the air by a bubbling tube containing 1 inch of heavy mineral oil, was charged 250 g. of myrcene, distilled (80%) and 2.5 g. of cupric acetate. The flask was evacuated and 56 g. of anhydrous hydrogen chloride was passed in over the surface at 10° C. over a 4½ hour period. The batch was agitated an additional ½ hour at 10° C. The crude chlorides amounted to 308.5 g.

To the myrcene hydrochloride was added 159.1 g. anhydrous sodium acetate and the batch agitated at 10° C. for 15 minutes. 6.18 g. Phosphorus trichloride was added and 3.82 g. of ammonia gas was passed in over the surface at 10° C. over a 22 minute period with vigorous agitation.

| Sample | Total Agitation Time (Hrs.) | Percent Hydrocarbon and Chlorides | Percent Linalyl Acetate | Percent Terpinyl acetate and Isomers | Percent Neryl Geranyl Acetates | Total percent Linalyl, Neryl, Geranyl Acetates |
|---|---|---|---|---|---|---|
| 1 | 1 | 52.3 | 36.7 | 2.0 | 9.1 | 45.8 |
| 2 | 2¼ | 30.0 | 50.7 | 2.7 | 13.5 | 64.2 |
| 3 | 4¼:9 | 26.8 | 54.6 | 2.9 | 15.7 | 70.3 |
| 4 | 6¼ | 26.1 | 54.6 | 2.7 | 16.6 | 71.2 |

The salts were dissolved in 600 ml. of water. The aqueous layer was extracted with 100 ml. of hexane and the hexane layer added to the oil layer. The oil-hexane layer The batch was heated to 90° C. and agitated at 90–95° C. for 7⅓ hours. Samples were taken at intervals during the agitation period, washed, dried and analyzed by V.P.C.

| Sample | Total Agitation Time (Hrs.) | Percent Hydrocarbon and Chlorides | Percent Linalyl Acetate | Percent Terpinyl acetate and Isomers | Percent Neryl Geranyl Acetates | Total percent Linalyl, Neryl, Geranyl Acetates |
|---|---|---|---|---|---|---|
| 1 | 1 | 24.2 | 57.7 | 1.1 | 17.0 | 74.7 |
| 2 | 2 | 23.1 | 57.9 | 1.1 | 17.9 | 75.8 |
| 3 | 3 | 24.1 | 56.0 | 1.4 | 18.5 | 74.5 |
| 4 | 5 | 21.2 | 57.8 | 1.2 | 19.8 | 77.6 |
| 5 | 7 | 22.3 | 56.5 | 1.4 | 19.8 | 76.3 | was washed 2× 100 ml. of water, 1× 50 ml. of 10% NaHCO₃. The hexane was removed by distillation under slightly reduced pressure. The residual crude acetates amounted to 315 g. (3.5% Cl). The crude analyzed by V.P.C. as follows: 24.5% hydrocarbons and chlorides, 56.4% linalyl acetate, 2.6% terpinyl acetates and isomers, 16.4% neryl, geranyl acetates.

The crude acetates were saponified as follows: Into a one liter flask, equipped with an agitator, thermometer, and a condenser was charged 350 g. methanol, 140 g. of 50% aqueous sodium hydroxide solution. The batch was agitated and heated to reflux and the crude acetates were added over a 10 minute period. The batch was agitated and refluxed for 8 hours. The methanol was distilled off at atmospheric pressure to a pot temperature of 95° C. The recovered methanol was diluted with twice its weight of water and the oil added to the batch. The crude was sepa- The salts were dissolved in 600 ml. of water. The aqueous layer was extracted with 100 ml. of hexane and the hexane layer added to the oil layer. The oil-hexane layer was washed 2× 100 ml. of water, 1× 50 ml. of 10% NaHCO₃. The hexane was removed by distillation under slightly reduced pressure. The residual crude acetates amounted to 310 g. (1.3% Cl). The crude analyzed by V.P.C. as follows:

| | Percent |
|---|---|
| Hydrocarbons and chlorides | 20.0 |
| Linalyl acetate | 59.4 |
| Terpinyl acetates and isomers | 0.9 |
| Neryl, geranyl acetates | 19.7 |

The crude acetates were saponified as follows: Into a one liter flask, equipped with an agitator, thermometer, and a condenser was charged 350 g. methanol, 140 g. of 50% aqueous sodium hydroxide solution. The batch was agitated and heated to reflux and the crude acetates were added over a 10 minute period. The batch was agitated and refluxed for 8 hours. The methanol was distilled off at atmospheric pressure to a pot temperature of 95° C. The recovered methanol was diluted with twice its weight of water and the oil added to the batch. The crude was separated and washed 2× 100 ml. of water and 2× 50 ml. saturated salt water. The crude alcohol amounted to 250 g. (0.53% Cl).

The crude alcohol analyzed by V.P.C. as follows:

| | Percent |
|---|---|
| Hydrocarbons and chlorides | 24.4 |
| Linalool | 59.5 |
| Terpineol and isomers | 1.2 |
| Nerol, geraniol | 14.9 |

The crude alcohol was vacuum distilled at 5 mm. using a 37 cm. column packed with glass helices. The fractions were analyzed by V.P.C. and the yield of alcohols calculated on the basis of 100% myrcene charged.

The weight yields were 59.6% linalool and 15.9% nerol, geraniol.

The total weight yield was 75.5% linalool, nerol, geraniol based on 100% myrcene charged.

EXAMPLE VII

Into a 1 liter flask equipped with an agitator, thermometer, gas inlet tube and sealed to the air by a bubbling tube containing 1 inch of heavy mineral oil, was charged 250 g. of myrcene, distilled (80%) and 2.5 g. of cupric acetate. The flask was evacuated and 56 g. of anhydrous hydrogen chloride was passed in over the surface at 10° C. over a 4½ hour period. The batch was agitated an additional ½ hour at 10° C. The crude chlorides amounted to 308.5 g.

To the myrcene hydrochloride, were added 2.5 g. cuprous chloride and 159.1 g. anhydrous sodium acetate and the batch was agitated 15 minutes at 10° C. 6.18 g. Phosphorus trichloride was added and 3.82 g. ammonia gas was passed in at 10° C. over a 10 minute period with vigorous agitation. The batch was heated to 75° C. and agitated at 75° C. for 8 hours.

Samples were taken at intervals during the agitation period, washed, dried and analyzed by V.P.C.

mm. using a 37 cm. column packed with glass helices. The fractions were analyzed by V.P.C. and the yield of esters calculated on the basis of 100% myrcene charged.

The weight yields were 70.7% linalyl acetate and 26.8% neryl, geranyl acetates.

The total weight yield was 97.5% linalyl, neryl, geranyl acetates based on the weight of 100% myrcene charged.

The foregoing illustrates the practice of this invention, which, however, is not to be limited thereby but is to be construed as broadly as permissible in view of the prior art and limited solely by the appended claims.

What is claimed is:

1. A process for preparing esters which comprises reacting at least one member of the group consisting of myrcene hydrohalide, linalyl halide, neryl halide and geranyl halide with a fatty acid salt in the presence of an addition compound of 1 mole of phosphorus trichloride and 5 moles of ammonia as a catalyst.

2. A process in accordance with claim 1, wherein said member is myrcene hydrohalide.

3. A process in accordance with claim 2, wherein the fatty acid salt is sodium acetate.

4. A process in accordance with claim 2, in which from about 1 to 1.5 mols of fatty acid salt and from about 0.001 to 0.1 mol of catalyst per mol of myrcene halide are employed and the reaction is conducted at a temperature within the range from about 70° C. to 100° C.

5. A process in accordance with claim 4, wherein myrcene hydrochloride is said member and sodium acetate is the fatty acid salt.

6. A process in accordance with claim 5, wherein cuprous chloride is also used.

7. A process in accordance with claim 5, wherein about 300 parts of myrcene hydrochloride and about 160 parts of sodium acetate were reacted in the presence of about 5 to 10 parts of $PCl_3 \cdot (NH_3)_5$ at a temperature within the range from about 90° C. to 95° C.

8. A process in accordance with claim 7, wherein the $PCl_3 \cdot (NH_3)_5$ was formed in situ.

9. A process in accordance with claim 8, wherein cuprous chloride is also used.

| Sample | Total Agitation Time (Hrs.) | Percent Hydro-Carbon and Chlorides | Percent Linalyl Acetate | Percent Terpinyl Acetate and Isomers | Percent Neryl, Geranyl Acetates | Total percent Linalyl, Neryl, Geranyl Acetates |
|---|---|---|---|---|---|---|
| 1 | 1 | 40.0 | 38.0 | 2.0 | 20.0 | 68.0 |
| 2 | 8 | 19.6 | 59.8 | 1.0 | 19.6 | 79.4 |

The salts were dissolved in 600 ml. of water. The aqueous layer was extracted with 100 ml. of hexane and the hexane layer added to the oil layer. The oil-hexane layer was washed 2× 100 ml. of water, 1× 50 ml. of 10% $NaHCO_3$. The hexane was removed by distillation under slightly reduced pressure. The residual crude esters amounted to 315 g. (0.96% Cl). The crude analyzed by V.P.C. as follows: 19.4% hydrocarbons and chlorides 59.3% linalyl acetate, 1.0% terpinyl acetates and isomers, 20.3% neryl, geranyl acetates.

The crude acetate mixture was vacuum distilled at 5

References Cited
UNITED STATES PATENTS 3,076,839  2/1963  Webb _____ 260—489
3,293,286  12/1966  Webb _____ 260—489

JAMES A. PATTEN, Primary Examiner

V. GARNER, Assistant Examiner

U.S. Cl. X.R.

23—87; 252—435